United States Patent [19]
Kuwajima

[11] Patent Number: 5,823,504
[45] Date of Patent: Oct. 20, 1998

[54] ADJUSTING MECHANISM FOR ADJUSTING THE INSTALLATION ANGLE OF APPLIANCES

[75] Inventor: Wataru Kuwajima, Kawasaki, Japan

[73] Assignee: Nitsuko Corporation, Kanagawa, Japan

[21] Appl. No.: 861,652

[22] Filed: May 22, 1997

[30] Foreign Application Priority Data

Jul. 3, 1996 [JP] Japan .................................... 8-193937

[51] Int. Cl.⁶ .................................................. A47G 29/00
[52] U.S. Cl. ........................ 248/685; 248/188.8; 248/688
[58] Field of Search .................................. 248/685, 688, 248/188.6, 188.8, 188.91

[56] References Cited

U.S. PATENT DOCUMENTS

| | | | |
|---|---|---|---|
| 2,665,866 | 1/1954 | Goldringe | 248/685 X |
| 4,113,212 | 9/1978 | Coriden | 248/688 X |
| 4,735,394 | 4/1988 | Facco | 248/188.8 X |
| 4,856,748 | 8/1989 | Obermeyer | 248/685 X |
| 4,940,204 | 7/1990 | Nelson et al. | 248/688 |
| 5,297,003 | 3/1994 | Nomura et al. | 248/685 X |
| 5,478,035 | 12/1995 | Kneile | 248/188.6 |
| 5,620,163 | 4/1997 | Wu | 248/688 |

*Primary Examiner*—Ramon O. Ramirez
*Assistant Examiner*—Derek J. Berger
*Attorney, Agent, or Firm*—Leydig, Voit & Mayer

[57] ABSTRACT

An adjusting mechanism for installing angle of appliances includes a first leg part rotatably mounted at one end portion to a bottom part of an appliance for supporting the appliance at a first installing position as rotated by a predetermined angle from a position being in parallel to the bottom part with the other end portion engaged with an installing plane, and a second leg part rotatably mounted at one end portion to the other end portion of the first leg part for supporting the appliance at a second installing position together with the first leg part in the first installing position, as rotated by a predetermined angle from a position opposing in parallel the first leg part with the other end portion engaged with the installing plane. The appliance can be thus adjusted in two stages in installing angle with respect to the installing plane, without impairing its appearances, but with the operability and observability of functions effectively improved.

7 Claims, 5 Drawing Sheets

0
ADJUSTING MECHANISM FOR ADJUSTING THE INSTALLATION ANGLE OF APPLIANCES

BACKGROUND OF THE INVENTION

This invention relates to mechanism for adjusting installing angle of such appliances as, for example, display-type desk telephones of the type having a liquid crystal display (LCD) section and the like capable of displaying called line telephone number, duration of a call, rate for a call and so on and, in particular, to an adjusting mechanism for installing angle of appliances which allows the angle to be adjusted in two stages without impairing appearances.

DESCRIPTION OF RELATED ART

In respect of the LCD section of such appliances, it happens that its display is very difficult to observe depending on an angle of observation, state of light source or the like conditions, and it becomes necessary to vary an attitude of the appliance to have the LCD section tilted with respect to the user so that the display will be clear.

The above is not limited only to the LCD section, but the tilted installation is also effective to easier observation of respective keys and so on provided to the appliance and to easier handling of the appliance.

As the adjusting mechanism for installing angle of appliances, there has been suggested one, for example, in Japanese Patent Laid-Open Publication No. 6-30096, in which a telephone set is provided at its bottom face with a mounting base for being detachable in its projected state, and a tilt foot is mounted to a recess formed on bottom side of this mounting base. The tilt foot is provided for being rotated between a housed position of being laid within the recess and a set position of being raised, so that the telephone set can be installed in a tilted state with the tilt foot placed in the set position.

With the known adjusting mechanism for installing angle of appliances as described in the above, however, there has been a problem that appearances of the telephone set is impaired by such arrangement that the mounting base is projected from the bottom face of the telephone set. Further, the foregoing adjusting mechanism for installing angle of appliances involves a problem that the handling easiness of the telephone set cannot be sufficiently improved since the mechanism allows the user to take no other position than the single set state of the tilt foot.

SUMMARY OF THE INVENTION

An object of the present invention is, therefore, to provide an adjusting mechanism for installing angle of appliances which is capable of eliminating the foregoing problems and improving the recognizability of the LCD or the like display section of the appliances with the installing angle of the appliances made adjustable in two stages.

According to the present invention, the above object can be realized by means of an adjusting mechanism for installing angle of appliances, comprising a first leg part rotatably mounted at one end portion to a bottom face of the appliance for supporting the appliance at a first angled position with the other end portion of the first leg part engaged with an installing plane at a first installing position into which the first leg part is rotated by a predetermined angle from a retracted position where the first leg part is substantially in parallel with the bottom face of the appliance, and a second leg part rotatably mounted at one end portion to the other end portion of the first leg part for supporting the appliance at a second angled position together with the first leg part with the other end portion of the second leg part engaged with the installing plane at a second installing position into which the second leg part is rotated by a predetermined angle from a housed position opposing the first leg part substantially in parallel therewith.

According to a more concrete working aspect of the present invention, further, there is provided an adjusting mechanism for installing angle of appliances, comprising a first leg part having a major wall and both side walls and rotatably mounted at one end portion of the side walls to a bottom part of the appliance for supporting the appliance at a first angled position with the other end portion of the first leg part engaged with an installing plane at a first installing position into which the first leg part is rotated by a predetermined angle from a retracted position where the first leg part is substantially in parallel with the bottom part of the appliance, said first leg part being formed to have one of mutually complementary projection and recess in the other end portion of the major wall and a pair of opposing slots in the other end portion of the side walls; and a second leg part comprised of a major wall having the other of said mutually complementary projection and recess in one end portion and of both side walls having at one end portion a pair of pins to be inserted in the pair of slots of the first leg part, the second leg part being rotatably mounted at the one end portion to the first leg part with the pins inserted in the opposing slots for supporting the appliance at a second angled position together with the first leg part in the first installing position, as rotated by a predetermined angle about the pins as the center from a housed position of the second leg part opposing in parallel the first leg part, with the other of the complementary projection and recess of the second leg part fitted in the one of the complementary projection and recess of the first leg part as the pins slide along the slots of the first leg part towards the one end portion of the first leg part, and with the other end portion of the second leg part engaged with the installing plane in the above state.

Further according to another working aspect of the present invention, an aperture is formed in the major wall at the one end portion of the first leg part, and the other end portion of the second leg part faces this aperture in the housed position of the second leg part opposing in parallel the first leg part.

In the present invention, therefore, the adjusting mechanism for the installing angle of appliances does not impair the appearances of the appliances, since, in the event where the mechanism is not required to function for adjusting the installing angle of the appliance, the first and second leg parts can be disposed in the state substantially parallel with the bottom face of the appliance with the second leg part rotated into the housed position opposing in parallel the first leg part, so that the mechanism can be compactly folded.

Further, the adjusting mechanism for installing angle of appliance of the present invention may be provided to the appliance either in a single or in a plurality as spaced one another.

In the present invention, further, the mutually complementary projection and recess may not be particularly limited in their shape but may be of any shape in which they can fit each other, and examples will be rectangular shape or substantially semicircular shape as seen vertically with respect to the major wall. Further, the projection or recess may be provided either in single or in a plurality.

Other objects and advantages of the present invention shall become clear as the description of the invention advances as detailed with reference to a preferred embodiment shown in accompanying drawings.

Figure 1:
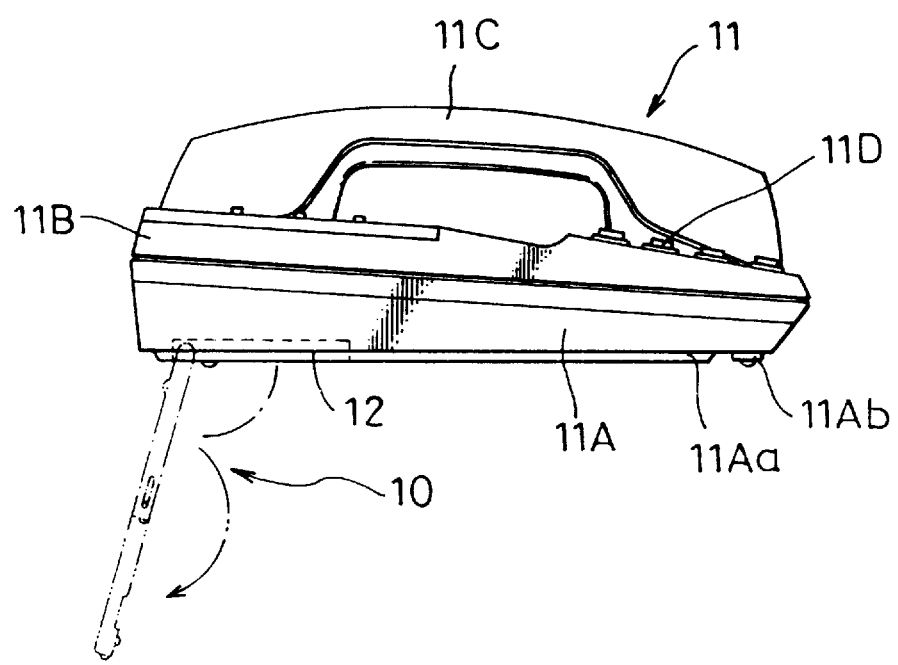
FIG. 1 is a side view of a telephone set to which the adjusting mechanism for installing angle of appliances in an embodiment of the present invention is applied.

While the present invention shall now be described with reference to the embodiment shown in the drawings, it should be appreciated that the intention is not to limit the present invention only to the particular embodiment shown but rather to include all alterations, modifications and equivalent arrangements possible within the scope of appended claims.

DETAILED DESCRIPTION OF THE PREFERRED EMBODIMENT

Referring concretely to the present invention on the basis of the embodiment, there is shown in FIG. 1 an application of the adjusting mechanism for installing angle of appliances 10 of the present invention to a desk type telephone set 11. In this case, desirably two of the adjusting mechanism 10 are provided to both side end portions to rear end side of bottom plate 11A of a lower case 11A forming part of the telephone set 11 as mutually separated in its widthwise direction vertical to the plane of the drawing, while only one of the two mechanisms is shown in the drawing.

As shown, the lower case 11A constitutes a body of the display-type telephone set 11 together with an upper case 11B. The body of the telephone set 11 is provided with a handset 11C detachably mounted thereon, with operating keys including ten keys 11D as has been known in front side part on top face of the body, and with an LCD display and indicating lamps at predetermined positions as has been also known, which known elements are not shown here. Further, along front side edge of the bottom plate 11Aa of the lower case 11A, elastic members 11Ab such as rubber pads are provided.

Figure 2:
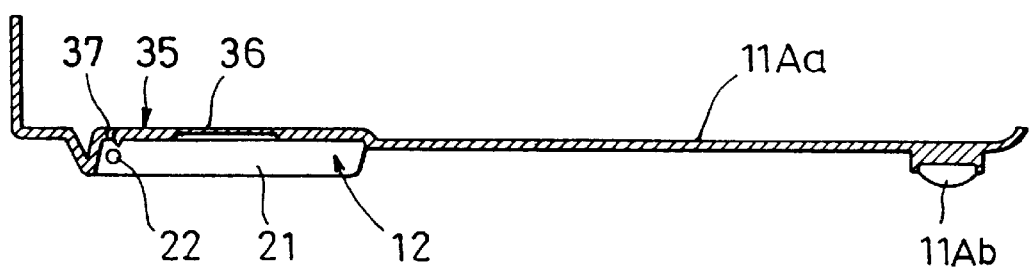
FIG. 2 is a sectioned view of a lower case in the telephone set of FIG. 1.

In the bottom plate 11Aa of the lower case 11A of the telephone set 11, there is formed a receptacle 12 as seen best in FIG. 2 as recessed into the body of the telephone set 11 on the rear end side. As shown by broken line in FIG. 1 or in section of FIG. 3, the adjusting mechanism 10 is retracted into this receptacle 12, so as not to project to the exterior.

Figure 8:
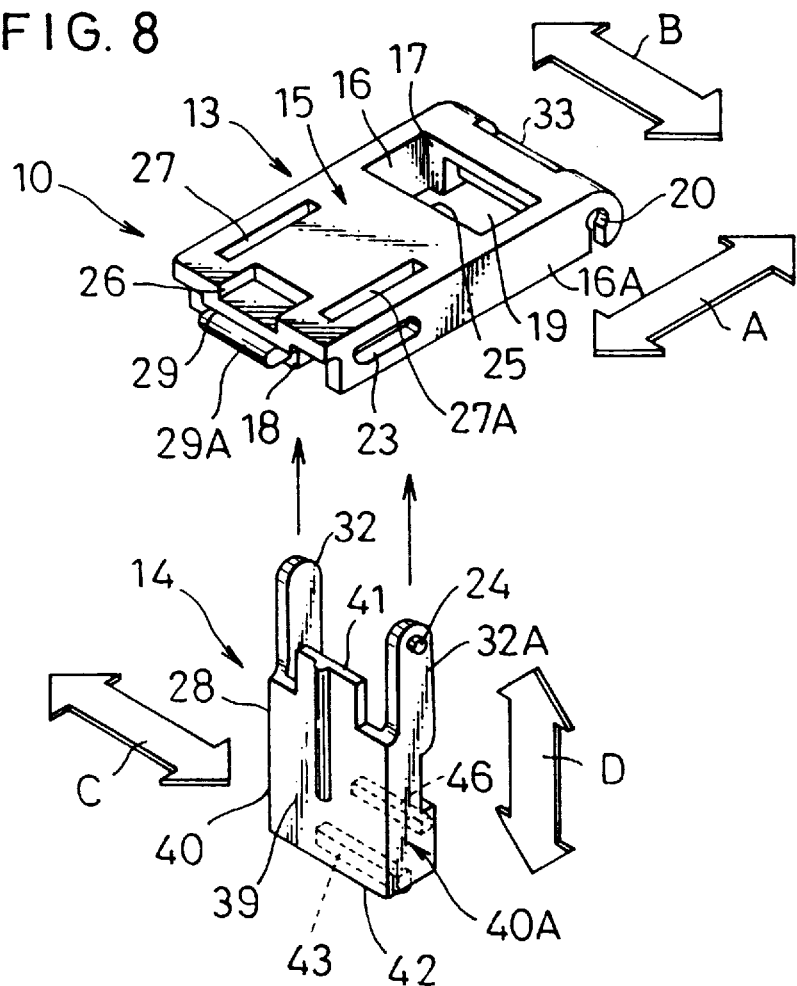
FIG. 8 is a perspective view as disassembled of the adjusting mechanism for installing angle of appliances shown in FIG. 3.

The adjusting mechanism 10 comprises a first leg part 13 and a second leg part 14, as shown more concretely in FIG. 8. The first leg part 13 is formed to have a rectangular major wall 15 and narrow side walls 16 and 16A extending vertically from both longitudinal side edges of the major wall 15 (the edges being ones opposing in the direction of arrow B in FIG. 8).

Further, the first leg part 13 is provided with a forward end wall 17 vertically extending at one logitudinal end (in the direction of arrow A in FIG. 8) of the major wall 15, and with a rear end wall 18 vertically extending at the other longitudinal end of the major wall 15. As surrounded by these major wall 15, both side walls 16 and 16A, forward end wall 17 and rear end wall 18, a housing space 19 is defined for housing therein the second leg part 14 as detailed in the followings (see also FIG. 10).

At one end portions in the longitudinal direction (of the arrow A in FIG. 8) of the respective side walls 16 and 16A of the first leg part 13, pivoting grooves 20 are formed to open in the vertically extending direction of the side walls, which pivoting grooves 20 correspond to short pivot shafts 22 projecting laterally from opposing side walls 21 (only one of them is shown in FIG. 2) forming the receptacle 12 in the bottom plate 11Aa of the lower case 11A of the telephone set 11 as shown in FIG. 2. That is, the first leg part 13 is made mountable to the bottom face 11Aa by fitting the pivoting grooves 20 of the first leg part 13 through their openings to the pivot shafts 22 projected from the side walls 21 of the receptacle 12.

Figure 3:
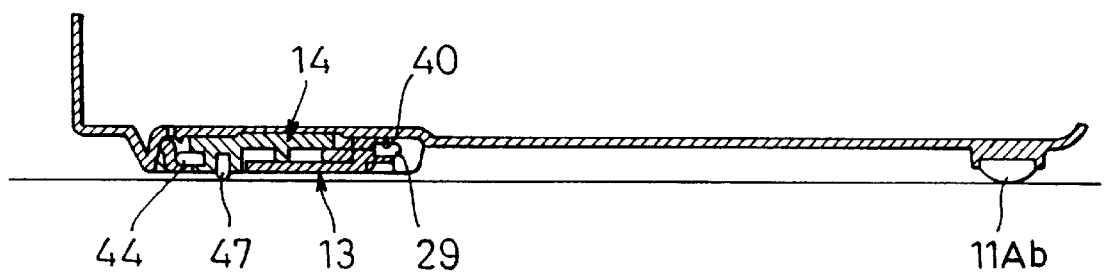
FIG. 3 is a sectioned view of the lower case in the telephone set also of FIG. 1 with the adjusting mechanism of FIG. 1 shown also in section as mounted to the lower case and in retracted position.
Figure 4:
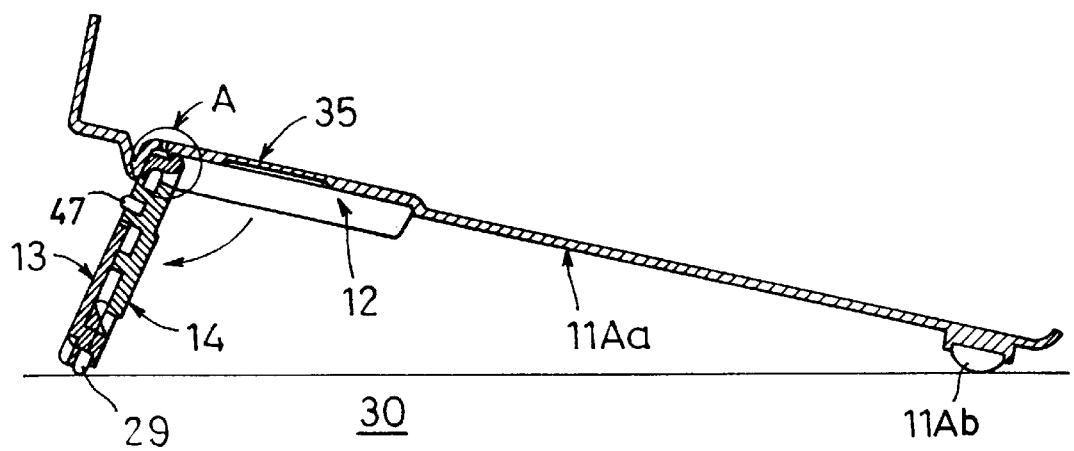
FIG. 4 is a sectioned biew of the lower case of the telephone set with the adjusting mechanism in FIG. 3 for explaining the operation of the mechanism.

With the above arrangement, the first leg part 13 is disposed rotatable about the pivot shafts 22 of the lower case 11A as the center between a housed position in which the part 13 is substantially in parallel with the bottom plate 11Aa of the lower case 11A of the telephone set 11 as shown in FIG. 3 and a first installing position (position capable of supporting the telephone set 11 at a first angled state) as shown in FIG. 4.

In this case, as shown in FIG. 8, the side walls 16 and 16A are provided in the other end side of their longitudinal direction with mutually opposing slots 23 lying in the longitudinal direction, in correspondence to later described pivot pins 24 and 24A of the second leg part 14.

Figure 9:
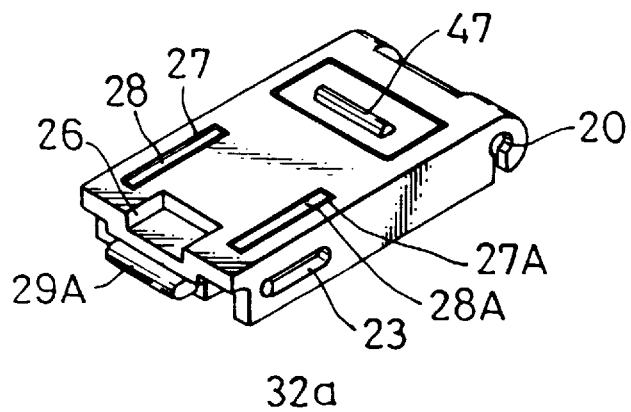
FIG. 9 is a perspective view as assembled of the adjusting mechanism in a state where the second leg part is housed in housing space of the first leg part.

In adjacent portion to the one longitudinal end of the major wall 15, a rectangular opening 25 is formed and, in the center of adjacent portion to the other longitudinal end of the major wall 15, a recess 26 of a rectangular shape in plan view of the major wall 15 is formed to open on the other longitudinal end side of the wall 16. Further, in the major wall 15, a pair of slits 27 and 27A are formed in adjacent portion to the other longitudinal end to lie along both longitudinal side edges. These slits 27 and 27A are provided for receiving therein corresponding portions 28 and 28A of the second leg part 14 when the second leg part 14 is housed in the housing space 19 of the first leg part 13 as shown in FIG. 9, so that the thickness T (see FIG. 11) of the side walls 16 and 16A of the first leg part 13 can be reduced by that extent.

Figure 10:
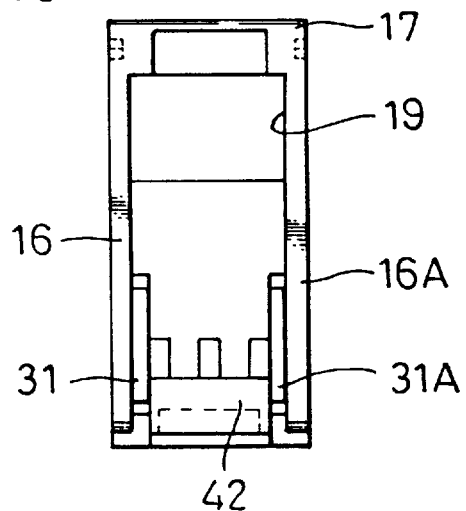
FIG. 10 shows in a plan view the first leg part of the adjusting mechanism of FIG. 3 as seen from the reverse side of the major wall.
Figure 11:
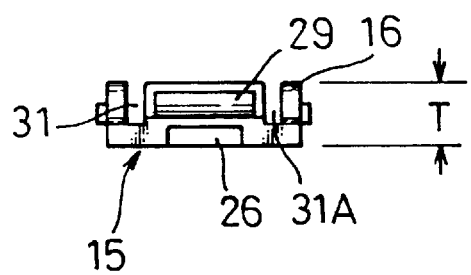
FIG. 11 is a side view of the first leg part on one end side.

In the rear end wall 18 of the first leg part 13, an engaging rubber pad 29A is fitted in a receiving groove 29, as shown in FIG. 8 or 11, for engagement with an installing plane 30 in the first installing position of FIG. 4. As shown in FIGS. 10 and 11, insertion grooves 31 and 31A are formed between the rear end wall 18 and both side walls 16 and 16A, for insertion of later described extending arms 32 and 32A of the second leg part 14.

Figure 7:
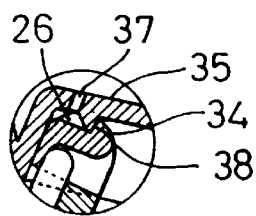
FIG. 7 is a fragmentary magnified view in section of an encircled portion "A" in FIG. 4.

As shown also in FIG. 8, a latching groove 33 is formed substantially in the center of the widthwise direction (of the arrow B in FIG. 8) of the forward end wall 17 of the first leg part 13, which latching groove 33 is formed to be substantially in an L-shape in section of FIG. 7 as cut along the longitudinal direction of the major wall 15 and having a latch 34 at a forward end to be engageable with a pawl section 35 formed to project from the bottom plate 11Aa of the telephone set 11.

The pawl section 35 is made integral at its one end base 36 with the bottom plate 11Aa of the lower case 11A in the telephone set 11, as seen in FIG. 2, while a slit 37 is formed through the bottom plate 11Aa on rear side of the end base 36, so as to render the pawl section 35 to be resiliently deformable inward and outward (vertical directions in FIG. 2). The other projecting end of the pawl section 35 is formed as a latching pawl 38 projecting downward (outward from the lower case) for engagement thereto of the latch 34 of the first leg part 13, as shown in FIG. 7.

As shown in FIG. 8, the second leg part 14 comprises a substantially rectangular major wall 39 having both side walls 40 and 40A shortly extended from both widthwise (arrow C of FIG. 8) side edges vertically with respect to the major wall 39, while these side walls 40 and 40A are extended at their one end beyond an end of the major wall 39 in its longitudinal direction (of arrow D in FIG. 8) to form extending arms 32 and 32A having at their extended ends pivot pins 24 projected laterally outward.

Figure 6:
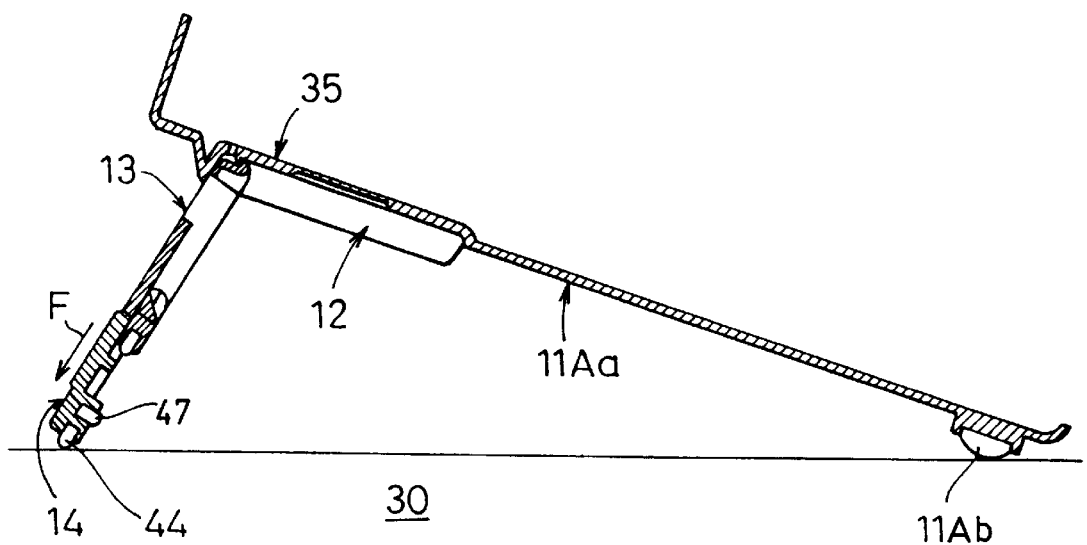
FIG. 6 is a sectioned view of the lower case of the telephone set and the adjusting mechanism of FIG. 3 for explaining still further operation of the mechanism.

On the same one end side of the major wall 39 and substantially in the center of widthwise direction, a projection 41 is formed to extend in the same plane as the major wall 39 and to be in a shape complementary to the recess 26 of the first leg part 13, that is, in the same rectangular shape as the recess 26 of the first leg part 13 in the present instance. In the other end wall 42 of the second leg part 14, as shown in FIG. 8 or 12, a groove 43 is formed, and an engaging rubber pad 44 is fitted into this groove 43, as shown in FIG. 3, for engagement with the installing plane 30, as shown in FIG. 6.

Figure 12:
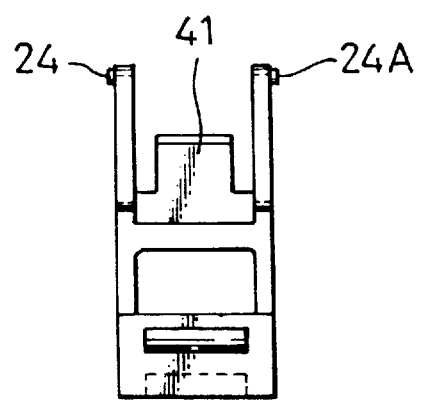
FIG. 12 is a plan view of the second leg part of the adjusting mechanism shown in FIG. 3 as seen from the reverse side of the major wall.

Further, on the side opposite to the major wall 39 and close to the other end wall 42 of the second leg part 14, a groove 46 is formed as shown in FIG. 12 and an engaging rubber pad 47 is fitted in this groove 46 as shown in FIGS. 3–6 and 9.

The second leg part 14 arranged as has been described is coupled to the first leg part 13 by inserting the pivot pins 24 of the extending arms 32 and 32A into the slots 23 and 23A of the first leg part 13. In this mounted state, the second leg part 14 is provided rotatable with the pivot pins 24 as fulcrum, between the housed position in the housing space 19 of the first leg part 13 (the position shown in FIG. 4) and a position laid to be substantially flush with the first leg part 13 (the position shown in FIG. 5), in which latter position the telephone set 11 being supported at a second angled position of a larger or steeper angle than the foregoing first angled position.

In the state where the second leg part 14 is housed in the first leg part 13, the engaging pad 47 of the second leg part 14 is disposed to project out of the opening 25 of the first leg part 13, as shown in FIGS. 4 and 9.

The operation of the adjusting mechanism 10 in the present embodiment according to the present invention shall be described in the followings.

The adjusting mechanism 10 is generally housed in the receptacle 12 of the telephone set 11 in the state where the second leg part 14 is retracted in the housing space 19 of the first leg part 13. When the telephone set 11 is placed on the installing plane with the adjusting mechanism 10 in the housed state, the engaging pad 47 is brought into engagement with the installing plane as shown in FIG. 3, so as to function as a slip preventing means for the telephone set 11. In this installing state of the telephone set 11, the adjusting mechanism 10 normally cannot be observed from the exterior and does not impair the appearances of the telephone set. In this housed state, further, the side walls 40 and 40A of the second leg part 14 are partly inserted in the slots 27 of the first leg part 13, as shown in FIG. 9, the side walls 40 and 40A including the extending arms 32 and 32A of the second leg part 14 can be reduced in the thickness to an extent of the thickness of the major wall 15 of the first leg part 13.

In an event when the telephone set 11 should desirably be installed as angled in response to such demand that the operability of keys and the observability of LCD display be improved, the user touches the other end side having the pad 29, righthand side in FIG. 3, of the adjusting mechanism 10, rotates the mechanism clockwise in FIG. 3 about the pivot shafts 22 as the center, to position the adjusting mechanism 10 in the first installing position (the state of FIG. 4).

During this rotation of the entire mechanism, the latch 34 of the first leg part 13 urges the latching pawl 38 of the bottom plate 11Aa in the lower case 11A of the telephone set 11 upward to resiliently deform the pawl section 35 of the bottom plate 11Aa also upward. As the adjusting mechanism 10 reaches the first installing position, the pawl section 35 returns to the original position with its own resiliency, whereby the latch 34 is latched by the latching pawl 38 as shown in FIG. 7, and anticlockwise rotation of the adjusting mechanism 10 to reset to the original position is blocked. Bringing the engaging pad 29 of the adjusting mechanism 10 placed in the first installing position into engagement with the installing plane 30, the telephone set 11 is held in the first angled position.

Figure 5:
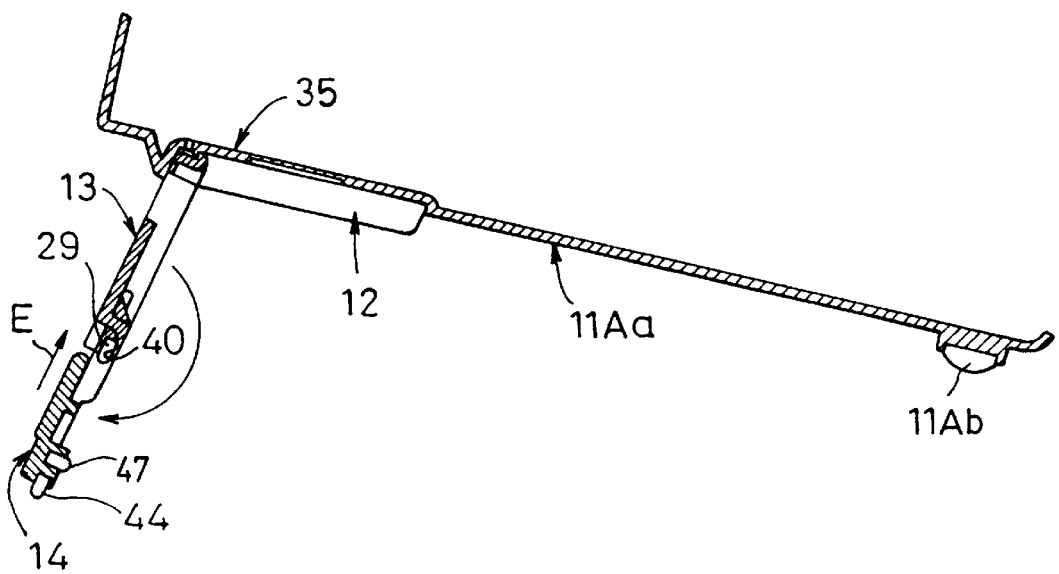
FIG. 5 is a sectioned view of the lower case of the telephone set and the adjusting mechanism in FIG. 3 for explaining further operation of the mechanism.

When it is intended to support the telephone set 11 in a larger tilting angled position than the first angled position, the user pushes the engaging pad 47 to rotate the corresponding end side of the second leg part 14 to dispose it out of the first leg part 13, the second leg part 14 is then rotated clockwise as held by fingers, about the pivot pins 24 as the center, to attain the state of FIG. 5.

Next, the second leg part 14 is pushed towards the first leg part 13 in their longitudinal direction (of arrow E in FIG. 5), whereby the second leg part 14 shifts in that direction with the pivot pins 24 slid as guided along the slots 23 so that the projection 41 of the second leg part 14 engages in the recess 26 of the first leg part 13, and both leg parts 13 and 14 are fixedly coupled in a state causing no shaking. With the engaging pad 44 of the second leg part 14 engaged with the installing plane 30 in this state, the telephone set 11 can be supported at the second angled position of a larger angle than the first angled position (the state of FIG. 6).

In the present embodiment, as has been described, the engaging pad 47 of the second leg part 14 is arranged to be projected out of the opening 25 of the first leg part 13 for the rotating operation of the second leg part 14 to dispose it out of the housing space 19 of the first leg part 13, so that the next rotating operation of the second leg part 14 can be easily attained, and the operability of the mechanism can be improved.

When it is intended to restore the first angled position of the telephone set 11 supported in the second angled position, the above described steps should only be performed in reverse sequence. That is, in the state of FIG. 6, the second leg part 14 is pulled in inverse direction of arrow F in FIG. 6, and the engagement of the projection 41 in the recess 26 is released into the state of FIG. 5. Then, the second leg part 14 is rotated anticlockwise in FIG. 5, whereby the adjusting mechanism 10 is brought into the state of FIG. 4, and the telephone set 11 can be supported at the first angled position.

In the case when the adjusting mechanism 10 in the state of FIG. 4 is to be housed into the housing space 19 of the lower case 11A of the telephone set 11, the foregoing steps may be performed in reverse sequence. That is, the adjusting mechanism 10 in the state of FIG. 4 is rotated anticlockwise, with the lower extended end of the mechanism held, in which rotation the adjusting mechanism 10 is allowed to be rotated by attaining the state in which the latch 34 urges the latching pawl 38 of the pawl section 35 resiliently upward, that is, in the state where the pawl section 35 is resiliently deformed inward of the telephone set 11. As the adjusting mechanism 10 rotates by a predetermined angle, the latch 34 rides over the latching pawl 38 to render the pawl section 35 to reset to the original position with the resiliency, and the adjusting mechanism 10 is housed in the housing space 19.

Since in the present embodiment, as has been described, the adjusting mechanism 10 is not provided to extend over the entire width of the telephone set 11 but at least two of the mechanism are disposed as mutually spaced in the widthwise direction, the adjusting mechanism 10 of the present invention can be minimized in size.

Further, it should be readily appreciated that the adjusting mechanism 10 for installing angle of appliances is applicable not only to the desk type telephone set, but also to such small office automation appliances as word processors.

What is claimed is:

1. An arrangement including an electric appliance adapted for operation with a bottom face thereof resting on an installation plane and an adjusting mechanism for adjusting an installation angle of the appliance with respect to the installation plane when the appliance is resting on the installation plane, the adjusting mechanism comprising:

a first leg part rotatably mounted at a first end portion thereof to a first end portion of the bottom face of the appliance for supporting the appliance at a first angle with respect to the installation plane with a second end portion of the first leg part and a second end portion of the bottom face resting on the installation plane at a first installation position of the adjusting mechanism to which the first leg part is rotated by a predetermined angle from a retracted position in which the first leg part is substantially parallel to the bottom face of the appliance; and a second leg part rotatably mounted at a first end portion thereof to the second end portion of the first leg part for supporting the appliance at a second angle with respect to the installation plane larger than the first angle together with the first leg part with a second end portion of the second leg part and the second end portion of the bottom face resting on the installation plane at a second installation position of the adjusting mechanism to which the second leg part is rotated by a predetermined angle from a housed position opposing and substantially parallel to the first leg part.

2. The arrangement according to claim 4 wherein the appliance is a display-type appliance having an upper portion thereof, the adjusting mechanism enabling an angle of the display to be adjusted.

3. The arrangement according to claim 1 wherein the appliance comprises a telephone.

4. An arrangement including an electric appliance adapted for operation with a bottom part thereof resting on an installation plane and an adjusting mechanism for adjusting an installation angle of the appliance with respect to the installation plane when the appliance is resting on the installation plane, the adjusting mechanism comprising:

a first leg part having a substantially flat major wall and two side walls rotatably mounted at a first end portion of the first leg part to a first end portion of the bottom part of the appliance for supporting the appliance at a first angle with respect to the installation plane with a second end portion of the first leg part and a second end portion of the bottom part of the appliance resting on the installation plane at a first installation position of the adjusting mechanism to which the first leg part is rotated by a predetermined angle from a retracted position in which the first leg part is substantially parallel to the bottom part of the appliance, the first leg part having one of a mutually complementary projection and recess in the major wall at the second end portion of the first leg part and a pair of slots in the side walls at the second end portion of the first leg part; and a second leg part comprising a substantially flat major wall having the other of the mutually complementary projection and recess at a first end portion of the second leg part and two side walls having at the first end portion of the second leg part a pair of pins to be inserted into the pair of slots of the first leg part, the second leg part being rotatably mounted at the first end portion of the second leg part to the first leg part with the pins inserted into the slots for supporting the appliance at a second angle with respect to the installation plane larger than the first angle together with the first leg part in the first installation position of the adjusting mechanism, as rotated by a predetermined angle about the pins from a housed position of the second leg part opposing and parallel to the first leg part, with the other of the complementary projection and recess of the second leg part fitted into the one of the complementary projection and recess of the first leg part as the pins slide along the slots of the first leg part towards the first end portion of the first leg part, and with the second end portion of the second leg part and the second end portion of the bottom part of the appliance resting on the installation plane in a second installation position of the adjusting mechanism.

5. The arrangement according to claim 4, wherein an aperture is formed in the major wall at the first end portion of the first leg part, and the second end portion of the second leg part has an engaging portion which extends out of the aperture away from the bottom part of the appliance when the first leg part is in its retracted position and the second leg part is in its housed position to contact the installation plane and support the appliance on the installation plane together with the second end portion of the bottom part of the appliance.

6. The arrangement according to claim 4 wherein the appliance is a display-type appliance having an upper portion, the adjusting mechanism enabling an angle of the upper portion to be adjusted.

7. The arrangement according to claim 4 wherein the appliance comprises a telephone.

\* \* \* \* \*

UNITED STATES PATENT AND TRADEMARK OFFICE
CERTIFICATE OF CORRECTION

PATENT NO.    : 5,823,504
DATED         : October 20, 1998
INVENTOR(S)   : Wataru Kuwajima It is certified that error appears in the above-identified patent and that said Letters Patent is hereby corrected as shown below:

```
Column 8, Line 9, delete "thereof" ;

Line 10, change "display"

to --upper portion--.
```

Signed and Sealed this

Twelfth Day of January, 1999

Attest:

Attesting Officer

*Acting Commissioner of Patents and Trademarks*